(12) United States Patent
Schaer et al.

(10) Patent No.: US 11,425,142 B2
(45) Date of Patent: *Aug. 23, 2022

(54) LOCATION BASED AUTHENTICATION

(71) Applicant: NAGRAVISION S.A., Cheseaux-sur-Lausanne (CH)

(72) Inventors: Olivier Schaer, Cheseaux-sur-Lausanne (CH); Sami Karoui, Cheseaux-sur-Lausanne (CH); Florent Schlaeppi, Cheseaux-sur-Lausanne (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 291 days.

This patent is subject to a terminal disclaimer.

(21) Appl. No.: 16/585,350

(22) Filed: Sep. 27, 2019

(65) Prior Publication Data

US 2020/0137072 A1    Apr. 30, 2020

Related U.S. Application Data

(63) Continuation of application No. 15/624,001, filed on Jun. 15, 2017, now Pat. No. 10,484,395.

(30) Foreign Application Priority Data

Jun. 15, 2016    (GB) ..................................... 1610421

(51) Int. Cl.
*H04L 9/40*    (2022.01)
*H04W 4/021*    (2018.01)
(Continued)

(52) U.S. Cl.
CPC ........ *H04L 63/107* (2013.01); *H04L 63/0853* (2013.01); *H04W 4/021* (2013.01);
(Continued)

(58) Field of Classification Search
CPC .. H04L 63/107; H04L 63/0853; H04W 4/021; H04W 12/06; H04W 12/08;
(Continued)

(56) References Cited

U.S. PATENT DOCUMENTS 7,822,846 B1 * 10/2010 Biere ...................... H04L 67/06
                                                                    709/224
10,326,813 B2 * 6/2019 Gyimesi ............. H04L 65/4084
(Continued)

FOREIGN PATENT DOCUMENTS

EP         2276248 A2    1/2011

OTHER PUBLICATIONS

Zhu et al., "Video Streaming Over Wireless Networks" 5 pages (Year: 2015).
(Continued)

*Primary Examiner* — Huan V Doan
(74) *Attorney, Agent, or Firm* — Polsinelli LLP

(57) ABSTRACT

A method of enabling a user to access recorded data associated with an event, the method comprising determining the location of a user's device at a control unit, confirming the location is within a predetermined vicinity and that the user's device was at the location within a predetermined period and the control unit enabling access for the user to the data if the location of the user's device in the predetermined period is confirmed.

16 Claims, 4 Drawing Sheets

(51) Int. Cl.
  *H04W 12/08* (2021.01)
  *H04W 12/06* (2021.01)
  *H04W 12/63* (2021.01)

(52) U.S. Cl.
  CPC ............ *H04W 12/06* (2013.01); *H04W 12/08*
     (2013.01); *H04W 12/63* (2021.01)

(58) Field of Classification Search
  CPC ......... H04W 12/63; H04W 4/02; G06F 21/10;
                          G06F 21/6218
  See application file for complete search history.

(56) References Cited

U.S. PATENT DOCUMENTS

| | | | |
|---|---|---|---|
| 10,484,395 B2 | 11/2019 | Schaer et al. | |
| 2003/0103149 A1 | 6/2003 | Kinjo et al. | |
| 2006/0104600 A1* | 5/2006 | Abrams | H04N 21/21805 |
| | | | 386/223 |
| 2009/0059035 A1 | 3/2009 | Shinoda et al. | |
| 2011/0022471 A1* | 1/2011 | Brueck | G06Q 30/02 |
| | | | 705/14.61 |
| 2011/0066743 A1 | 3/2011 | Hurley et al. | |
| 2012/0246689 A1 | 9/2012 | Thomas et al. | |
| 2013/0054750 A1* | 2/2013 | Rossmann | H04N 21/4788 |
| | | | 709/219 |
| 2013/0124461 A1 | 5/2013 | Dombrowski et al. | |
| 2013/0166651 A1* | 6/2013 | Joshi | H04L 65/403 |
| | | | 709/204 |
| 2013/0170819 A1 | 7/2013 | Dykeman | |
| 2014/0150042 A1 | 5/2014 | Pacor | |
| 2014/0328578 A1 | 11/2014 | Shafron | |
| 2015/0262616 A1* | 9/2015 | Jaime | G11B 27/034 |
| | | | 386/228 |
| 2015/0312264 A1 | 10/2015 | Ortiz et al. | |
| 2015/0350291 A1* | 12/2015 | Contreras Murillo | |
| | | | H04L 65/602 |
| | | | 709/219 |
| 2015/0350692 A1 | 12/2015 | Narasimhan et al. | |
| 2016/0094943 A1 | 3/2016 | Cao | |
| 2016/0277773 A1* | 9/2016 | Ho | H04N 21/2668 |
| 2016/0286282 A1 | 9/2016 | Marek | |
| 2017/0188060 A1* | 6/2017 | Major | H04N 21/6581 |
| 2017/0220568 A1 | 8/2017 | Dombrowski et al. | |
| 2018/0211114 A1 | 7/2018 | Laska | |

OTHER PUBLICATIONS

Search Report for GB App No. 1610421.8 dated Feb. 6, 2017, 11 pgs.
Extended European Search Report dated Oct. 17, 2018 for European Patent Application No. 17176235.4; 6 pages.
Non-Final Office Action dated Nov. 15, 2018 for U.S. Appl. No. 15/624,001, 23 pages.
Notice of Allowance dated Jun. 5, 2019 for U.S. Appl. No. 15/624,001, 23 pages.

* cited by examiner

LOCATION BASED AUTHENTICATION

CROSS-REFERENCE TO RELATED APPLICATIONS

This application is a continuation of U.S. patent application Ser. No. 15/624,001 filed Jun. 15, 2017, which claims priority to GB Patent Application No. 1610421.8, filed Jun. 15, 2016, both of which are incorporated herein by reference in their entirety for all purposes.

FIELD

The disclosure relates to providing data associated with an event to a user, based on authentication of the user.

BACKGROUND

During a live event, such as a sporting event or concert, a spectator at the venue may wish to record footage or images of the event as a memento or to share with friends. The spectator uses his or her personal camera or smartphone to make a recording of all or part of the event. This recording can then be shared online or otherwise so that it can be accessed by others. However, the quality of the video may be poor due to such things as inadequate recording equipment, distance of the spectator from the action and/or poor camerawork by the spectator.

BRIEF DESCRIPTION OF THE DRAWINGS

Exemplary embodiments of the disclosure shall now be described with reference to the accompanying drawings in which.

Throughout the description and the drawings, like reference numerals refer to like parts.

DETAILED DESCRIPTION

Figure 1:
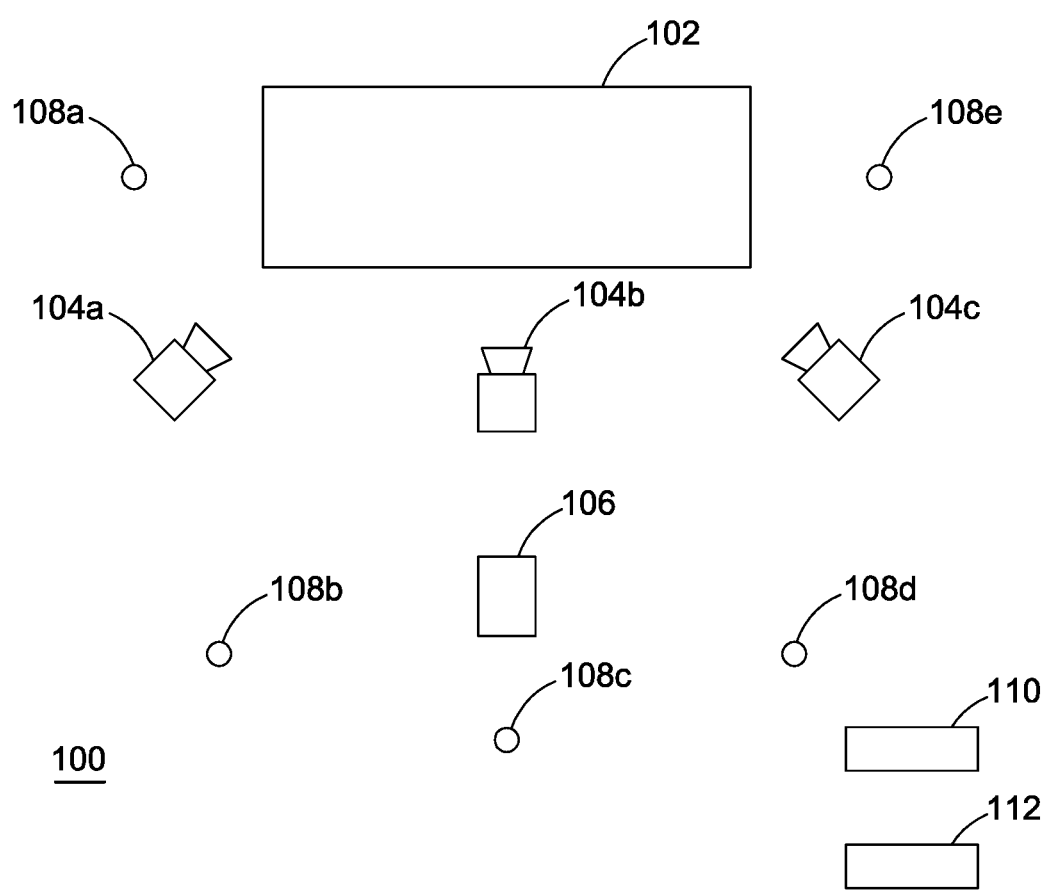
FIG. 1 shows an environment in which a live event is taking place.

FIG. 1 shows an environment 100 in which an arranged live event is taking place. The environment has a performance area 102 in which the live event such as a sporting, musical, political or other event is being performed. The live event is captured by installed video cameras 104a-c directed at the performance area 102 and possibly the crowd and other contributory aspects of the environment. Each video camera 104a-c has a defined location in the environment 100. In FIG. 1, three video cameras are shown, although it will be appreciated that any number of video cameras could be used in order to appropriately record the live event. The cameras may be part of a system set up to record the event for later or concurrent transmission, for example as a scheduled television program. Alternatively, the cameras may be dedicated to the purpose of implementing the system disclosed herein.

The live event is observed by a crowd of spectators in the environment 100. A spectator in the crowd has a user device 106, for example a smartphone, tablet, personal computer, smartwatch, or clicker, connected to the internet or other supporting communications network through a smartphone or radio frequency RF link such as Wi-Fi or Bluetooth.

The environment 100 also has a number of communication beacons 108a-e distributed about the environment. In this embodiment, the user device 106 communicates with the beacons 108a-e using Bluetooth, although other local and pico network communication schemes can be used to similar effect. Each beacon 108a-e is installed at a predefined position in the environment 100 and has its own ID. Each beacon 108a-e has a configurable broadcast range which allows it to connect with a device 106 and receive data via Bluetooth from anywhere within its broadcast range in the environment 100. The broadcast range of each beacon is adjusted so that the set of beacons provides a more or less comprehensive coverage for the spectating area of the environment. Five beacons are shown in FIG. 1, although it will be appreciated that any number of beacons can be used. It will also be appreciated that increasing the number of beacons increases the granularity of the location information as described below. It is also possible to implement the disclosed method/system with a single beacon.

The system and method according to the embodiment described provides the user with the ability to request access to video or other content recorded by one or more cameras 104a-c. The system and method disclosed enable the event organiser to provide a value added service to the user as customer by providing them with access to the content recorded at the event. The content may be linked to the approximate position of the user at the event so that the user has a professionally produced record of the event from the vicinity of their own position, or the user can choose one or more camera angles. The choice is extended to selecting parts of the event, such as songs at a concert or a speech at a lecture, or time limited clips as samples of the event. Such parts can be automatically selected coincident with the time of the request during the event. For example, if a user makes a request halfway through a song, the user can automatically be provided with the video recording of the complete song starting from before the request was made.

A control unit 110 is configured to communicate with the user device 106. The control unit 110 may be located within the environment 100 or remote from it. The control unit 110 has memory storage containing a database of the locations of the video cameras 104a-c, beacon IDs of the beacons 108a-e and their locations in the environment 100. The control unit 110 also stores details of the event, for example, event type, time and duration. The control unit 110 is configured to communicate with a media processing unit MPU 112 which is located within the environment 100, but may also be remote from it. The control unit 110 and the MPU 112 may be amalgamated into a single entity. The MPU 112 receives video streams from each of the video cameras 104a-c during the event. In this embodiment, the video and/or audio data in the stream is coded according to the Moving Picture Experts Group MPEG standard. Other coding formats can be used to similar effect. The streams are stored in the memory in the MPU 112 for consumption by a user, as will be described below.

The MPU 112 communicates with the control unit 110 and the video cameras 104a-c via Wi-Fi. Other communication schemes having a bandwidth capable of supporting the streamed content can be used. For example, if the control unit 110 and/or the MPU 112 are located remotely from the environment 100, communication may be enabled over a network such as the internet or cable.

During an event, the video cameras 104*a-c* record the live event that is occurring in the performance area 102. The video stream of the recorded event from each of the cameras is sent to the MPU 112 and tagged to the particular event, according to location of the event, time stamps and a camera source. The video content and tag data are stored at the MPU 112. The time stamps are applied to the recorded video at various points during the event to enable retrieval of the video based on a point in the duration of the event.

A user attending the event has, for example, a smartphone as a form of the user device 106. This has an application stored on it that enables the user to gain access to and order the recorded content stored at the MPU 112. There are two levels of security for access. First, the user has to login to the application by providing an email or other identifying handle and a password or PIN that is registered for the service. The user device then has to be validated for the event the user is attending. Once validated the user has access to the recorded content for the event on request as described below. The two levels of security are optional. The login may not be needed in certain situations. However, the validation of the user actually attending the event to gain access to the content is the desirable authentication step.

Figure 2:
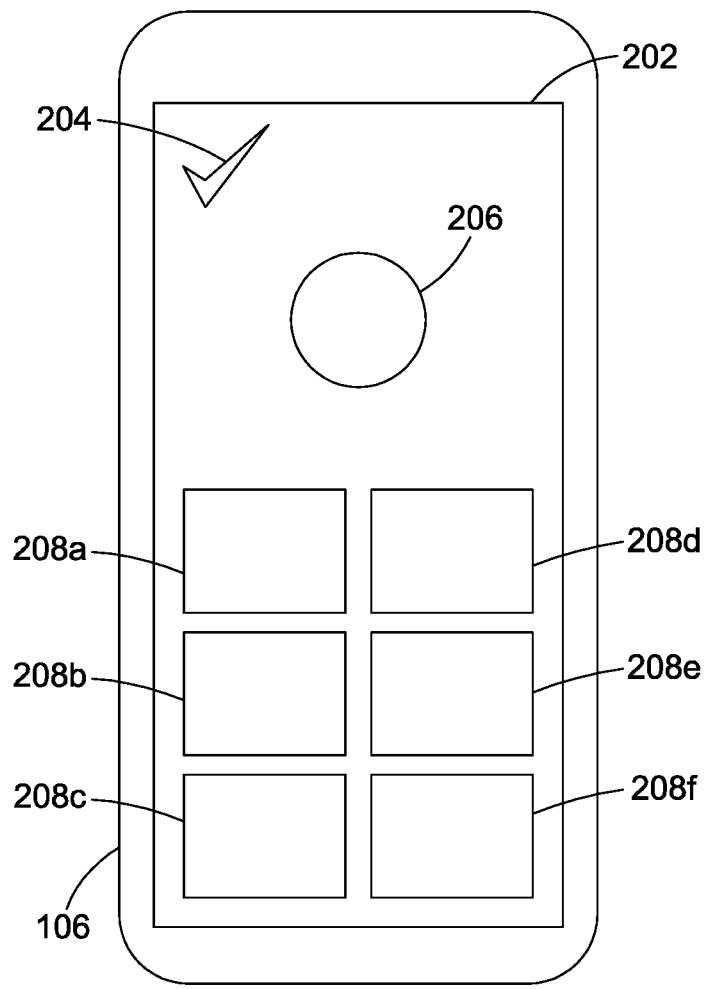
FIG. 2 shows a display on a user device to request access to video content.

The application installed in the user's smartphone 106 is illustrated by way of a screenshot in FIG. 2. The user having logged in at some point before or during the event, the application is then running on the device until it is disabled. In this embodiment the application constantly or intermittently monitors for transmissions of the beacons 108 so that the current position of the device 106 relative to the beacons is always known as the closest beacon in the network at any time is captured by the device 106. In the network of beacons, capture is effected by the device opting to retrieve beacon ID information from the beacon providing the highest signal strength. This will generally equate to the closest beacon. The information on beacon capture is stored on the device for use should the user decide at some point to request recorded content associated with the live event. The location information required by the system to verify the device is supplemented by the time of the beacon ID capture. In this way the device is validated as being in the correct location at the correct time for the event. If either the location information or the time information does not correspond to the event details stored at the control unit 110, the validation is unsuccessful and access to the recordings of the event is denied. To perform the validation the location information derived from the captured beacon ID and the time of capture are sent to the control unit 110 as evidence that the user device 106 is or was in the correct vicinity at the correct time. If the validation is successful a confirmation is sent back to the device 106 which is then arranged to display on the screen a validation symbol 204. This informs the user that he/she is able to make a request for recorded content associated with the attended event.

It is preferable for the user to enable the application on the user device and perform the login either at or close to the start of the event. The device is then ready to execute a request without undue delay. However, the application could be enabled at any time during the event as required by the user. This may be preferable if the user is concerned about battery life being inadequate for the duration of the live event. Once an indication 204 appears on the screen on the device 106 the application is ready to process a request. In an alternative embodiment the user can provide verification of the presence of the device at the event by using a built-in global positioning system GPS capability. The co-ordinates for a device with this functionality can provide the necessary location information with sufficient accuracy and the beacons 108*a-e* are then not needed as part of the system.

By running the application for a sustained period it is likely in some events that the user will move around the venue. The location information used for validation is the latest available either by beacon capture or GPS co-ordinates.

With the login and validation procedure carried out, the control unit 110 is able to confirm from its own database of events that the device is or was present at a particular event. It then enables access to recorded content for that event and sends a confirmation back to the device 106 which responds by illuminating the indication 204. In this state a button 206 on the screen is enabled. Pressing the button causes a request to be sent from the device to the control unit for recorded content. If the control unit is in or near the environment it is possible for the request to be sent via Wi-Fi or other local transmission networks. If the control unit 110 is remote from the environment the request can be sent, for example, via a mobile telecommunications network.

In an alternative embodiment the time and location information for validation of the device 106 and the request itself are transmitted to the control unit 110 in the same or consecutive transmissions but without the need to wait for validation before making a request. The control unit 110 then determines that the device is authorised to make the request at the time the request is made and sends an acknowledgment back to the device 106. This does not require a confirmatory indication 204, but this can instead be used by way of subsequent confirmation that the request has been received by the control unit and is deemed valid.

Once a valid request is received by the control unit 110, the user is offered recorded video from at least one selected camera position 104*a-c*. The video cameras each offer a different perspective of the recorded event. By using the beacon ID of the beacon captured by the user device 106 or the transmitted GPS information, and the known locations of the cameras 104*a-c*, the control unit 110 can offer by default the recorded video from the camera closest to the user location in the environment 100 of the event. This gives the user recorded content from a similar perspective to that of his position in the environment. Other perspectives provided by other video cameras may also be selected. For example, a choice may be offered of a main feed, an on-stage feed, a user perspective and a feed from elsewhere in the crowd. In this case the device location information is not needed to fix the position of the device 106 at or near a particular camera. As illustrated in FIG. 2, windows 208*a-f* are provided to show either thumbnails or short videos of the various camera perspectives if the user has a choice. By pressing one of the thumbnails, the request is supplemented with a specifier of the video of interest to the user. This is transmitted back to the control unit. The user then has the option of accessing the video content itself according to the selected perspective(s) at the time or later. This will be described below.

The control unit 110 can also use the time information of the user request to identify a specific part of the event, such as a song at a concert, or provide access to a defined clip of the song according to the selected camera angle. This is particularly applicable to discrete content at a live event such as a song, lecture or speech. However, the technique is equally applicable to delivering content that constitutes simply a portion of the event straddling the time of the request. Thus, the user is offered selections in the windows 208 *a-f* of different camera positions of the complete event, specific parts of the event straddling the request time and/or clips starting from or straddling the time of the request. The content can be made available immediately upon request or it can be reserved for later consumption.

Once the user has selected one or more of the offered recordings, the completion of the request is sent back to the control unit. The control unit 110 communicates with the MPU 112 and requests that the MPU 112 extracts from the stored content the video or portion associated with the time of the request. The MPU may extract a video clip that has been requested by a user device 106 in different ways. The video clip duration may be any length within the event. It may be a particular song at a musical event during which the request was received. For a defined part of the event such as a song in a concert, the clip can be arranged to coincide with the beginning and end of the part so that what is provided to the user is the complete song. Alternatively, discrete clips with a predetermined clip duration are marked in the stored video recording. The length can be predetermined by the control unit 110 or the MPU 112. For example, the stored video recording is marked in discrete clips of 30 seconds resulting in 120 clips per hour for the event. The MPU then retrieves the most appropriate clip for each request, that is, the clip during which the user request was made. Alternatively, the user can be enabled via the application on the user device 106 to define the clip start and length.

In another form, the clips are extracted from the stored content on the basis of a configurable time window that is applied for each individual request and its timestamp. For example, for a request at time "t", a clip may begin at t−10 seconds and last until t+20 seconds. This ensures that the user receives content that has just been witnessed, as well as content following the input for context.

Alternatively, the size and/or duration of a video file may be determined dynamically based on the number of requests received within a given period. For example, a clip may have a nominal duration of 15 seconds and a timeout window of 10 seconds. That is to say, for a request of time "t", a clip may begin at t−15 seconds and last until t. If a second request is received before t+/0 seconds, the duration of the video clip to be delivered is extended to include video content up to the second request. For example, if a second request is received at t+3 seconds, the final video clip will have a duration of 15 seconds+3 seconds=18 seconds. The clip duration is extended as further requests are received, up to a predetermined clip length, for example 30 seconds. This avoids producing large files and long video clips to be processed. In this example, the minimum duration of a clip is 15 seconds and the maximum duration of a clip is 30 seconds. In this way, a single clip can address one or more requests. The dynamic determination of video clip duration allows multiple requests received in a predetermined period to be mapped to the same video clip and the duplication of a given video moment across different video files is prevented. Furthermore, with this approach, a single request during an hour-long event would only materially generate a 15 seconds video file. This reduces storage requirements and processing time required.

In another form, the system may be configured to operate using a time limited buffer storing video content on a first-in-first-out FIFO basis. In this case, recorded content is stored in the buffer and then overwritten as newly recorded content becomes available once the buffer is full, using the FIFO approach. For example, only the previous 60 seconds of recorded content may be stored in the buffer at any given time. The buffer may be implemented at the MPU 112 or in a local memory in each respective camera 104*a-c*. The MPU 112 or the local memory could, of course, be configured to store a longer or shorter duration of recorded content depending on the context. The buffer provides an immediate starting point for a user request but without requiring all content for the entirety of the event to be stored. The storage is based on user demand.

In this mode, a request user to access stored content triggers the recording of further content, so that an extended duration of recorded content is provided beyond that which can be stored in the buffer. The extension of the duration of recorded content could be in line with one of the extraction methods discussed above. For example, the 60 seconds of data preceding a request are stored in the buffer and all or part of it may be copied to the memory in the MPU 112, with 20 seconds of recorded content following the request also stored in the memory in the MPU 112. In this way, the user can access content similar to that described above, although video is only streamed from the cameras 104*a-c* to the MPU 112 and/or stored at the MPU 112 over the duration of a live event in response to a request.

In the case that the buffer is implemented in a memory local to each respective camera 104*a-c*, no recorded content will even be streamed to the MPU 112 unless a user request is received.

Due to the reduction in streaming and storing requirements for video content, the system more efficiently manages video content. Such efficiency gains are particularly useful in the case that video cameras 104*a-c* have limited storage space and upload bandwidth, which would limit full stream recording or constant live stream uploading. When communicating with the MPU 112, the control unit 110 uses optimisation rules to cluster requests received from multiple user devices 106 for the same defined content within a predetermined time window and can consolidate them into a single request for the MPU 112. For example, if multiple users click to request the same content, such as a song, within a given window, only a single media file is requested from the stored content and generated by the MPU 112 to be accessed by the requesting user devices. By combining multiple requests from multiple users into a single file, storage and bandwidth efficiencies are realised.

Different request clustering methods may be performed. For example, one video file may be sent for all requests received over a given period. In the case that the format of the recorded video is HTTP Live Streaming HLS, a stream of video content is delivered through a series of consecutive discrete video clips which is stored at the MPU 112. One of these video clips may be sent for all requests received over a given period. Alternatively, one video clip may be sent once a given number of requests has been received. Alternatives to HLS for streaming the recorded video can be used to similar effect. The advantage of such streaming techniques as HLS is that they break the streamed video into discrete portions or clips that can be readily identified for purposes of selection.

Once a video clip is extracted from a stored video recording, the MPU 112 generates a file of the video clip and uploads it to a predefined storage platform for access. The storage platform is located remotely from the environment. Alternatively, or additionally, the storage platform may be located within the environment 100. The MPU 112 sends an access link, for example a URL, for the video clip to the control unit 110. The control unit 110 obfuscates the URL of the media clip through the use of a token based URL, where generation of a URL does not allow derivation of another valid URL. The control unit 110 then sends the obfuscated URL to the user device 106 where it is displayed for selection as a screen of the application. The user is then in possession of a link to the requested content.

The user can then access the video clip by navigating to the URL. The user can share the clip complemented with additional data, such as text comments, audio comments or images. The control unit 110 applies usage rules for the video clip, for example, a limit on the number of playbacks of the video content. In this way, the video clip may be limited to a certain number of retrievals, shares, replays and/or downloads. The limitation may be based on the identity of the device being used to access the video clip. For example, only user devices 106 authenticated as having been present at the event might be allowed to access the video clip, so that the clip can only be shared amongst attendees. Alternatively, other devices may be allowed to access the video clip, for example on a subscription or registration basis.

The limitations may be applied during the event and/or for a limited time after the event. After this time, the video clip may be arranged to no longer be available. Alternatively, the limitations may be applied for an unlimited time after the event.

A user who attended the event and had their user device validated before or during the event can be permitted access to view a convenient collection of the most popular content. Popularity can be defined in different ways. For example, the number of clip requests received during the event can be assessed at the control unit 110 to determine the most popular content. The control unit 110 then collates data on the usage of the service for an event and compiles information on audience behaviour that is of potential use to the event organisers and third parties for promotional purposes. The traffic between the user devices and the system is also useful data for deriving information for other promotional purposes, such as voting for a particular song at a concert.

Figure 3:
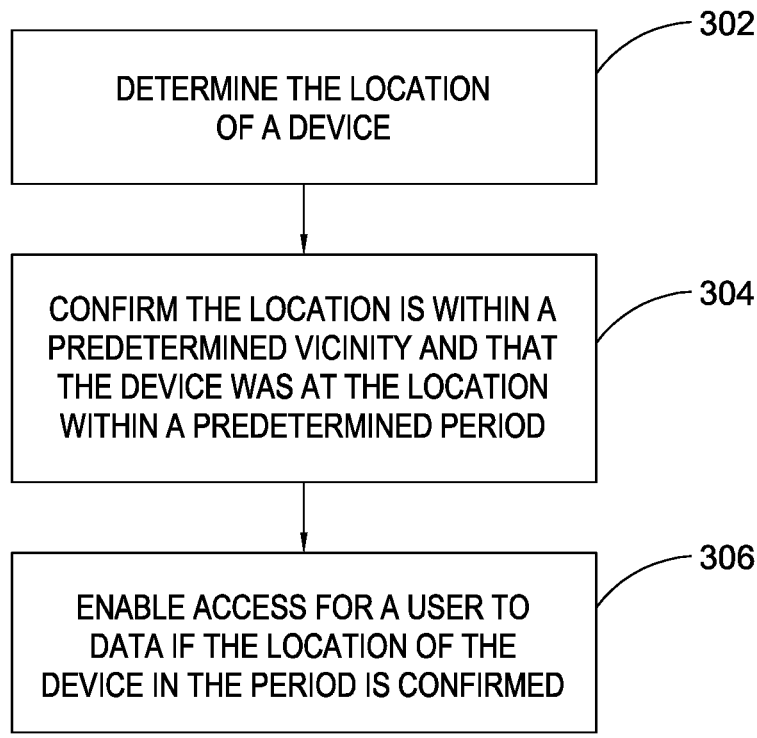
FIG. 3 shows a flow chart of a method of providing data associated with a live event to a user.

FIG. 3 shows a flow chart of a method 300 of enabling a user to access data associated with a live event. In this embodiment, the data is a video recording of the event. At step 302, the control unit 110 determines a location of the user device 106 from location data. The location data is derived from information based on the capture of the beacon ID of one of the beacons 108a-e by the device 106. At step 304, the control unit 110 confirms that the location derived from the location data is within a predetermined vicinity coincident with the event and that the device is at the location during the event. Alternatively, the time validation maybe within a period that starts before and ends after the scheduled time of the event or a specific window of time during the event according to the service provider's choice. At step 306, the control unit 110 enables access for the user to the recorded content if the location of the device in the period is confirmed.

In this embodiment, the user makes a request during the event. Rather than extracting a video clip based on the time of the user request, the user accesses any video content associated with the event that is available from the MPU 112. This is done either directly in response to the request or later, for example via a web browser. In this way, the control unit 110 confirms that the user was physically present at the event and enables the user to access the content, without communicating with the MPU 112 at the time. The user can then select preferred video content from any part of the event after the event has taken place, for example a particular song or the whole concert and desired camera position(s).

Figure 4:
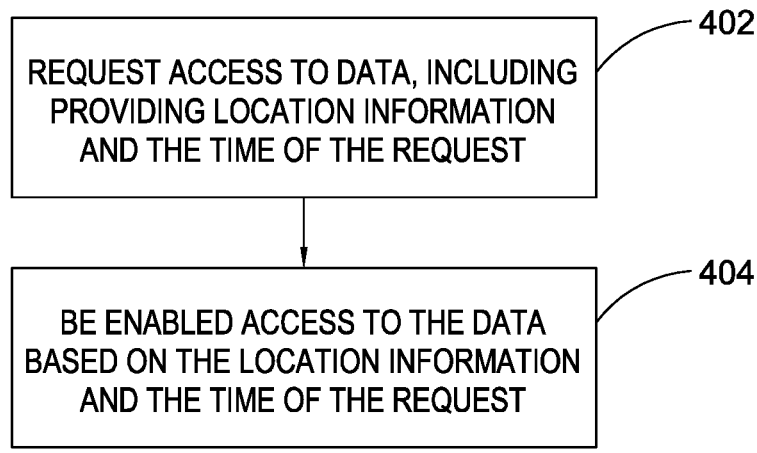
FIG. 4 shows a flow chart of a method of accessing a data stream associated with a live event from a user device.

FIG. 4 shows a flow chart of a method 400 of accessing data associated with a live event by the user device 106. At step 402, the user requests access to data using the user device 106. In this embodiment, the data is a stored video recording of the event. As above, the request includes providing location information and the time of the request. In this embodiment, the location information is the beacon ID of one of the beacons 108a-e. At step 404, the user is enabled to access the content on the user device 106 must be present within the vicinity of the event in order to be validated to access the relevant video content.

The system is adaptable to different contexts as it is applicable to different sources of media content. The system can therefore be applied to various different contexts, such as concerts, sports events, lectures, experimental laboratories, or any live event which can be recorded and shared.

Video cameras 104a-c can be professional cameras each operated by a cameraman or remotely from a control station. They, or some of them, may also be static. In other implementations, the video cameras can be replaced by any other suitable recording devices capable of providing a media feed to the MPU 112. For example, the amateur cameras based on smartphones, camcorders or action cameras could be used, or simply a microphone for audio recording only. In this way, other media content than video, such as images or audio, could be recorded and accessed by the user according to these disclosed embodiments. In the case that a smartphone, or other recording device with limited storage and bandwidth capability, is used, the buffer approach to recording content discussed above may be preferable.

Instead of video cameras at fixed locations, the video cameras 104a-c could be moveable. In this instance, the location of the video cameras is tracked and determined by the control unit 110 or the MPU 112 based on GPS data that is derived by each of the video cameras using installed GPS functionality and transmitted from there such that the control unit or the MPU 112 is able to monitor their positions. Similarly, the beacons 108a-e may also be moveable to cater, for example, for any event in which the live action moves from one place to another. The beacons are tracked using location information such as GPS. In one form, the beacons are each located on a respective video camera. The moveable beacons may each simply track an aspect of the event such that absolute location information is less important than the fact that a particular beacon is tracking a given aspect of the event.

Each beacon 108a-e can be associated with a different video feed for the same live event. For example, beacons 108a and b are associated with video camera 104a, while beacon 108c is associated with video camera 104b and beacons 108d and e are associated with video camera 104c. The control unit 110 can then identify a particular video associated with each beacon location using the mappings between the video cameras and the beacons.

Instead of Bluetooth, the user device 106 can communicate with the beacons via any wireless protocol that can interface the user device with each beacon. Instead of Wi-Fi, the user device 106 can communicate with the control unit 110 via a mobile network or Global System for Mobile GSM networks. Similarly, the position of the user device can be located through its own communications networks such as GSM, 3G, 4G or 5G instead of the beacon system referred to above or GPS.

When only links are shared between user device 106 and the control unit 110 for accessing recorded content, bandwidth efficiency is realised. A video file is only shared when accessed by the user by navigating to the associated URL. User recording of a video is no longer required as a user can access media content of the event through the control unit 110 and the recording devices, without using the processing and storage necessary to record content on the user device 106 itself.

The quality of captured content may also be improved as higher resolution recording devices may be used to capture the media content, rather than lower quality user devices having a recording function. Furthermore, as well as picture quality, angle of view and quality of direction is likely to be improved over user controlled handheld user devices.

A user does not need to invest personal time and/or have specialised knowledge to perform content capture and editing. The click of a button 206 in the application on the user device 106 can perform both the capture of the content and the editing at the same time. A user is not restricted to requesting a single recorded video of an event but can request multiple content items from multiple recording devices in sequence or simultaneously.

Disclosed herein is a method and system for supplementing a live event with the option for the attendee to access recorded content of the event. The attendee is validated as having been present at the event by location information processed through his/her user device. The attendee is able to make a request for content or a request for content options from which a selection can be made. The request can be made after access to the content has been enabled, at the same time or as a sequence as part of the same user action. The content is not accessed directly but is provided with a link to the requested content which can be retrieved at the attendee's convenience but possibly subject to usage restrictions imposed by the service provider.

A user may log into the service through an application as described above or a web page. The authentication process records the login information provided by the user, for example an email address, and also the unique device ID associated with that user device. This provides an extra layer of security to the process as only known subscribers may then use the service.

In accordance with an aspect of the disclosure there is provided a method of enabling a user to access data associated with an event to a user. The method comprises determining the location of a user's device at a control unit, confirming the location is within a predetermined vicinity and that the user's device was at the location within a predetermined period, and the control unit enabling access for the user to the data if the location of the user's device in the predetermined period is confirmed.

The data associated with the event may be a recording of at least part of the event recorded on a recording device. The recording may be a video recording recorded by a camera. The video recording may be captured by at least one camera, the at least one camera being located at a defined camera location in the vicinity of the event. The defined camera location may be mobile relative to the live event.

Location information may be sent for the control unit to determine the location of the user's device during the event. The location information may be sent to the control unit by the user's device. The method may include deriving the location information from a location device within the vicinity of the event. The user's device may communicate with the closest one of a plurality of location devices in the vicinity to receive the location information. The user's device may communicate with the location devices wirelessly and the closest location device may be determined by relative signal strength. The user's device may receive location information from the one location device. The user's device may generate its own location information.

The at least one location device may be at a fixed location relative to the live event. The at least one location device may be a wireless-enabled beacon. The user's device may be configured to monitor for the presence of the at least one location device.

The access to the data may be enabled in response to a request sent from the user's device. The request may be sent during the event. The data may be stored in a buffer configured to store data for a predefined period. The method may further comprise transferring, to a memory, at least some of the data stored in the buffer at the time of the request, and storing subsequent data recorded after the request in the memory. The request may be sent after the event.

In accordance with another aspect of the disclosure there is provided a method of enabling a user to access recorded data associated with an event. The method comprises determining the location of a user's device at a control unit, confirming the location is within a predetermined vicinity and that the user's device was at the location within a predetermined period, the control unit enabling access for the user to the data if the location of the user's device in the period are confirmed and receiving a request for the data.

The request may be sent during the event. The data may be stored in a buffer configured to store data for a predefined period. The method may further comprise transferring, to a memory, at least some of the data stored in the buffer at the time of the request, and storing subsequent data recorded after the request in the memory. The user's device may send location information for determining the location of the user's device. The location information may be sent with the request. The request may be sent after the location information.

The access to the data may be provided by a link received by the user's device. The link may be transmitted from the control unit in response to a request. The access to the data may comprise extracting a portion of the data associated with the event in response to the request. The portion of the data may be coincident with the time of the request. The portion of the data may be a predefined set of data on a portion of the event corresponding to a period within which the request is made. The portion of the data may be a set of data running from a predetermined time before the time of the request to a predetermined time after the request. The portion of the data may be determined based on the location of the user's device. The extracted data may be assigned an address for the user which is incorporated into the link.

Usage rules may be applied to the data such that access is restricted. The usage rules may comprise limiting the data to a number of retrievals, shares, playbacks and/or downloads. The data may be accessed via the link by another device determined to have been within the vicinity and within the period.

The user's device may be enabled to access the data for a limited period. The limited period may be the duration of the live event. The method may further comprise receiving a plurality of requests for data associated with the event from a plurality of devices, and compiling a single package of data for the plurality of devices. The compilation may be performed on a plurality of requests received in a predetermined period. The predetermined vicinity and period time may be coincident with the live event.

In accordance with another aspect of the disclosure there is provided a system for enabling a user to access data associated with a live event, the system comprising a control unit arranged to determine the location of a device, confirm the location is within a predetermined vicinity and that the user's device was at the location within a predetermined period, and enable access for the user to the data if the location of the user's device in the predetermined period is confirmed.

The system may further comprise at least one recording device, in which the data are a recording of at least part of the event recorded on the at least one recording device. The at least one recording device may be a camera and the recording may be a video recording. The video recording may be a recording of at least part of the event captured by at least one camera, the at least one camera being located at a defined camera location in the vicinity of the event.

Location information may be sent to the control unit which may be operable to determine the location of the user's device during the event. The location information may be sent to the control unit by the user's device. The user's device may be operable to derive the location information from a location device within the vicinity of the event. The system may further comprise a plurality of location devices in the vicinity to receive the location information. The user's device may be operable to communicate with the closest one of the plurality of location devices. The user's device may be operable to communicate with the location devices wirelessly and may be operable to determine the closest location device by relative signal strength. The user's device may be operable to receive location information from the one location device. The user's device may be operable to generate its own location information.

The at least one location device may be at a fixed location relative to the live event. The at least one location device may be a wireless-enabled beacon. The device may be configured to monitor for the presence of the at least one location device.

The access to the data may be enabled by the control unit in response to a request sent from the user's device. The request may be sent during the event. The system may further comprise a buffer configured to store data for a predefined period. The data may be stored in the buffer. The system may further comprise a memory. At least some of the data stored in the buffer at the time of the request may be transferred to the memory, and subsequent data recorded after the request may be stored in the memory. The request may be sent after the event.

In accordance with another aspect of the disclosure there is provided a system for enabling a user to access data associated with a live event, the system comprising a control unit arranged to determine the location of a device, confirm the location is within a predetermined vicinity and that the user's device was at the location within a predetermined period, and enable access for the user to the data if the location of the user's device in the period are confirmed and receive a request for the data.

The request may be sent during the event. The data may be stored in a buffer configured to store data for a predefined period. At least some of the data stored in the buffer at the time of the request may be transferred to a memory, and subsequent data recorded after the request may be stored in the memory.

The user's device may send location information for determining the location of the user's device. The location information may be sent with the request. The request may be sent after the location information.

The access to the data may be provided by a link sent by the user's device. The link may be transmitted from the control unit in response to a request. The access to the data may comprise extracting a portion of the data associated with the event in response to the request. The portion of the data may be coincident with the time of the request. The portion of the data may be a predefined set of data on a portion of the event corresponding to a period within which the request is made. The portion of the data may be a set of data running from a predetermined time before the time of the request to a predetermined time after the request. The portion of the data may be determined based on the location of the user's device. The extracted data may be assigned an address for the user which is incorporated into the link.

The system may further comprise a media processing unit "MPU" configured to extract a portion of the data associated with the event. The control unit may be configured to enable access for the user to the portion of the data. The MPU may be configured to extract the portion of the data based on the time of the request.

Usage rules may be applied to the data such that access is restricted. The usage rules comprise limiting the data to a number of retrievals, shares, playbacks and/or downloads.

The data may be accessed via the link by another device confirmed to have been within the vicinity and within the period. The control unit may be further configured to enable access to the data for a limited period. The limited period may be the duration of the live event. The control unit may be further configured to receive a plurality of requests for data associated with the event from a plurality of devices, and compile a single package of data to be accessed by the plurality of devices. The control unit may be configured to perform the compilation on a plurality of requests received in a predetermined period. The predetermined vicinity and period time may be coincident with the live event. The control unit may be located remote from an environment in which the live event is taking place. The MPU may be located remote from an environment in which the live event is taking place.

Figure 5:
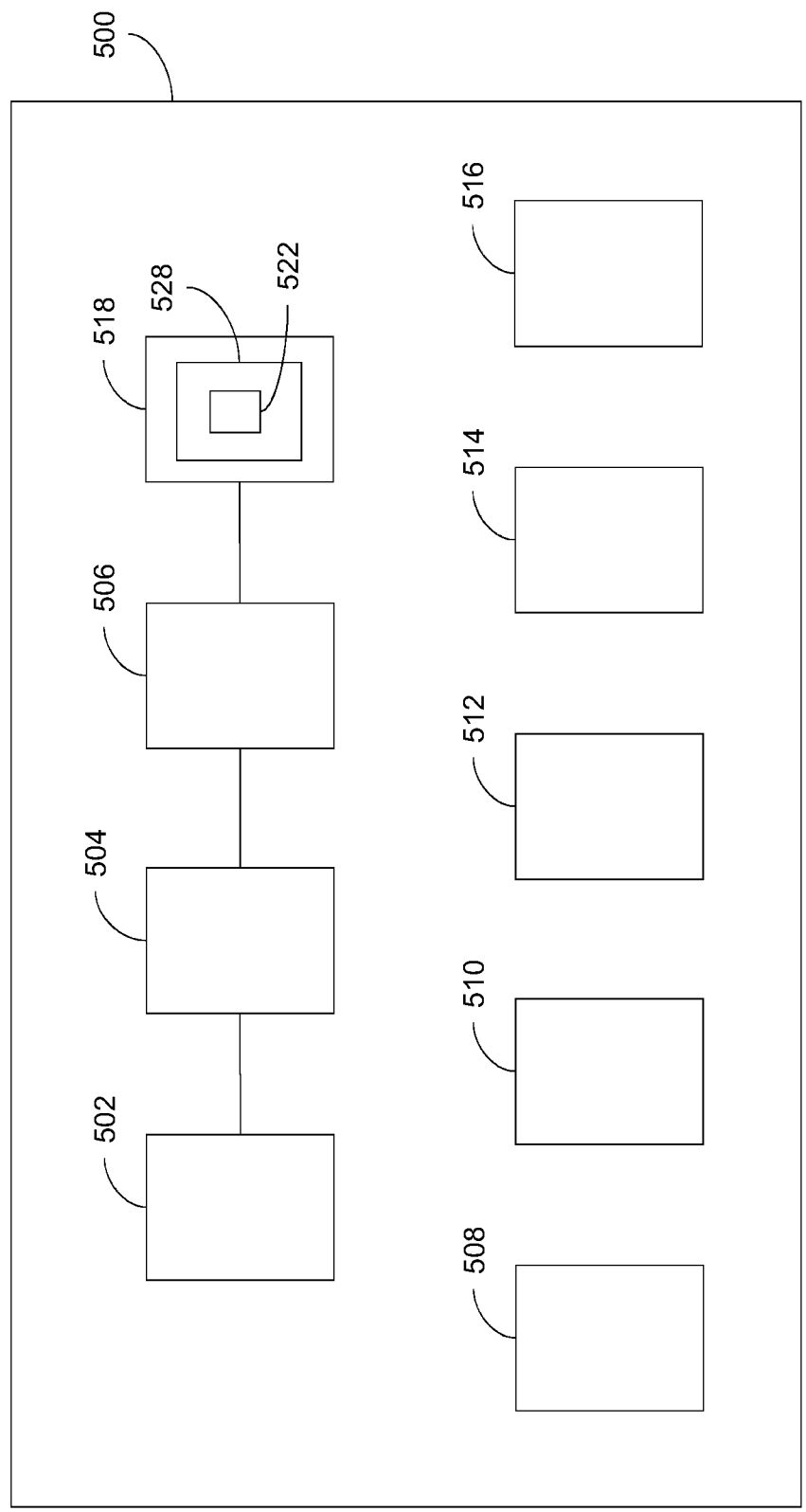
FIG. 5 shows a block diagram of one implementation of a computing device.

FIG. 5 illustrates a block diagram of one implementation of a computing device 500 within which a set of instructions, for causing the computing device to perform any one or more of the methodologies discussed herein, may be executed. In alternative implementations, the computing device may be connected e.g., networked to other machines in a Local Area Network LAN, an intranet, an extranet, or the Internet. The computing device may operate in the capacity of a server or a client machine in a client-server network environment, or as a peer machine in a peer-to-peer or distributed network environment. The computing device may be a personal computer PC, a tablet computer, a set-top box STB, a Personal Digital Assistant PDA, a cellular telephone, a web appliance, a server, a network router, switch or bridge, or any machine capable of executing a set of instructions, sequential or otherwise, that specify actions to be taken by that machine. Further, while only a single computing device is illustrated, the term "computing device" shall also be taken to include any collection of machines e.g., computers, that individually or jointly execute a set, or multiple sets, of instructions to perform any one or more of the methodologies discussed herein.

The example computing device 500 includes a processing device 502, a main memory 504 e.g., read-only memory ROM, flash memory, dynamic random access memory DRAM such as synchronous DRAM SDRAM or Rambus DRAM RDRAM, etc., a static memory 506 e.g., flash memory, static random access memory SRAM, etc., and a secondary memory e.g., a data storage device 518, which communicate with each other via a bus 530.

Processing device 502 represents one or more general-purpose processors such as a microprocessor, central processing unit, or the like. More particularly, the processing device 502 may be a complex instruction set computing CISC microprocessor, reduced instruction set computing RISC microprocessor, very long instruction word VLIW microprocessor, processor implementing other instruction sets, or processors implementing a combination of instruction sets. Processing device 502 may also be one or more special-purpose processing devices such as an application specific integrated circuit ASIC, a field programmable gate array FPGA, a digital signal processor DSP, network processor, or the like. Processing device 502 is configured to execute the processing logic instructions 522 for performing the operations and steps discussed herein.

The computing device 500 may further include a network interface device 508. The computing device 500 also may include a video display unit 510 e.g., a liquid crystal display LCD or a cathode ray tube CRT, an alphanumeric input device 512 e.g., a keyboard or touchscreen, a cursor control device 514 e.g., a mouse or touchscreen, and an audio device 516 e.g., a speaker.

The data storage device 518 may include one or more machine-readable storage media, or more specifically one or more non-transitory computer-readable storage media 528 on which is stored one or more sets of instructions 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting computer-readable storage media.

The various methods described above may be implemented by a computer program. The computer program product may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory RAM, a read-only memory ROM, a rigid magnetic disc, and an optical disk, such as a CD-ROM, CD-R/W or DVD.

In an implementation, the modules, components and other features described herein, for example control unit 110 in relation to FIG. 1, can be implemented as discrete components or integrated in the functionality of hardware components such as ASICS, FPGAs, DSPs or similar devices as part of an individualization server.

A "hardware component" is a tangible e.g., non-transitory physical component e.g., a set of one or more processors capable of performing certain operations and may be configured or arranged in a certain physical manner. A hardware component may include dedicated circuitry or logic that is permanently configured to perform certain operations. A hardware component may be or include a special-purpose processor, such as a field programmable gate array FPGA or an ASIC. A hardware component may also include programmable logic or circuitry that is temporarily configured by software to perform certain operations.

Accordingly, the phrase "hardware component" should be understood to encompass a tangible entity that may be physically constructed, permanently configured e.g., hardwired, or temporarily configured e.g., programmed, to operate in a certain manner or to perform certain operations described herein.

In addition, the modules and components can be implemented as firmware or functional circuitry within hardware devices. Further, the modules and components can be implemented in any combination of hardware devices and software components, or only in software e.g., code stored or otherwise embodied in a machine-readable medium or in a transmission medium.

Unless specifically stated otherwise, as apparent from the following discussion, it is appreciated that throughout the description, discussions utilizing terms such as "receiving," "determining," "comparing," "enabling," "maintaining," "identifying," or the like, refer to the actions and processes of a computer system, or similar electronic computing device, that manipulates and transforms data represented as physical, electronic, quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

Also disclosed is a method of enabling a user to access recorded data associated with an event, the method comprising determining the location of a user's device at a control unit, confirming the location is within a predetermined vicinity and that the user's device was at the location within a predetermined period, and the control unit enabling access for the user to the data if the location of the user's device in the predetermined period is confirmed.

Optionally, the data are a recording of at least part of the event recorded on at least one recording device. Optionally, the recording is a video recording recorded by at least one camera. Optionally, the video recording is a recording of at least part of the event captured by the at least one camera, the at least one camera being located at a defined camera location in the vicinity of the event.

Optionally, location information is sent for the control unit to determine the location of the user's device during the event. Optionally, the location information is sent to the control unit by the user's device. Optionally, the method includes deriving the location information from a location device within the vicinity of the event. Optionally, the user's device communicates with the closest one of a plurality of location devices in the vicinity to receive the location information. Optionally, the user's device receives location information from the one location device. Optionally, the user's device generates its own location information.

Optionally, the access to the data is enabled in response to a request sent from the user's device. Optionally, the request is sent during the event. Optionally, the data are stored in a buffer configured to store data for a predefined period. Optionally, the method further comprises transferring, to a memory, at least some of the data stored in the buffer at the time of the request, and storing subsequent data recorded after the request in the memory. Optionally, the request is sent after the event.

Optionally, the access to the data is provided by a link received by the user's device. Optionally, the link is transmitted from the control unit in response to a request. Optionally, the access to the data comprises extracting a portion of the data associated with the event in response to the request. Optionally, the portion of the data is coincident with the time of the request. Optionally, the portion of the data is a predefined set of data on a portion of the event corresponding to a period within which the request is made. Optionally, the portion of the data is a set of data running from a predetermined time before the time of the request to a predetermined time after the request. Optionally, the portion of the data is determined based on the location of the user's device. Optionally, the extracted data is assigned an address for the user which is incorporated into the link.

Optionally, usage rules are applied to the data such that access is restricted. Optionally, the usage rules comprise limiting the data to a number of retrievals, shares, playbacks and/or downloads.

Also disclosed is a system for enabling a user to access recorded data associated with an event, the system comprising a control unit arranged to determine the location of a user's device, confirm the location is within a predetermined vicinity and that the user's device was at the location within a predetermined period, and enable access for the user to the data if the location of the user's device in the predetermined period is confirmed.

Optionally, the system further comprises at least one recording device, in which the data are a recording of at least part of the event recorded on the at least one recording device. Optionally, the at least one recording device is at least one camera and the recording is a video recording recorded by the at least one camera. Optionally, the video recording is a recording of at least part of the event captured by the at least one camera, the at least one camera being located at a defined camera location in the vicinity of the event.

Optionally, location information is sent to the control unit which is operable to determine the location of the user's device during the event. Optionally, the location information is sent to the control unit by the user's device. Optionally, the user's device is operable to derive the location information from a location device within the vicinity of the event. Optionally, the system further comprises a plurality of location devices in the vicinity to receive the location information, in which the user's device is operable to communicate with the closest one of the plurality of location devices. Optionally, the user's device is operable to receive location information from the one location device. Optionally, the user's device is operable to generate its own location information.

Optionally, the access to the data is enabled by the control unit in response to a request sent from the user's device. Optionally, the request is sent during the event. Optionally, the system further comprises a buffer configured to store data for a predefined period, in which the data are stored in the buffer. Optionally, the system further comprises a memory, in which at least some of the data stored in the buffer at the time of the request is transferred to the memory, and subsequent data recorded after the request is stored in the memory. Optionally, the request is sent after the event.

Optionally, the access to the data is provided by a link sent by the user's device. Optionally, the link is transmitted from the control unit in response to a request. Optionally, the enabling comprises extracting a portion of the data associated with the event in response to the request. Optionally, the portion of the data is coincident with the time of the request. Optionally, the portion of the data is a predefined set of data on a portion of the event corresponding to a period within which the request is made. Optionally, the portion of the data is a set of data running from a predetermined time before the time of the request to a predetermined time after the request. Optionally, the portion of the data is determined based on the location of the user's device. Optionally, the extracted data is assigned an address for the user which is incorporated into the link.

Optionally, usage rules are applied to the data such that access is restricted. Optionally, the usage rules comprise limiting the data to a number of retrievals, shares, playbacks and/or downloads.

What is claimed is:

1. A method of providing access to recorded data associated with an event, the method comprising:
   determining, by a control unit, a location of a first device at a first time;
   confirming the location is within a predetermined vicinity coincident with the event and that the first time was within a time period associated with the event;
   receiving a first request for at least a portion of recorded data associated with the event, the first request being associated with the first device;
   receiving at least one additional request for at least the portion of the recorded data;
   consolidating the first request and the at least one additional request into a single request;
   extracting a portion of the recorded data, wherein the extracted portion of the recorded data includes a time window relative to a time of the first request, the time window including a first time equal to or before the time of the first request and a second time equal to or after the time of the first request;
   generating, for the single request, a common media file for the extracted portion of the recorded data; and
   providing for the first device or at least one additional device, access to the common media file for the extracted portion of the recorded data based on confirming that the first device was within the predetermined vicinity coincident with the event within the time period.

2. The method of claim 1, wherein the time window includes a first time before the time of the first request and a second time after the time of the first request.

3. The method of claim 1, wherein the time window includes a first time before the time of the first request and a second time after the time of the additional request.

4. The method of claim 1, wherein the time window includes a first time before the time of the additional request and a second time after the time of the additional request.

5. The method of claim 1, wherein the time window includes a first time before the time of the additional request and a second time after the time of the first request.

6. The method of claim 1, further comprising:
   determining a location of the least one additional device was within the predetermined vicinity coincident with the event within the time period; and
   providing for the at least one additional device, access to the common media file for the extracted portion of the recorded data based on confirming that the least one additional device was within the predetermined vicinity coincident with the event within the time period.

7. The method of claim 1, wherein the recorded data is based on a video of at least part of the event captured by at least one camera of the first device, the at least one camera being located at a location of the event.

8. The method of claim 7, wherein the first device is a mobile device.

9. The method of claim 1, further comprising:
   determining a number of requests associated with one or more portions of the recorded data;
   selecting one or more clips from the recorded data to include in a collection of clips, the one or more clips being selected based on the number of requests; and
   providing at least one of the first device or the at least one additional device with access to the collection of clips.

10. The method of claim 1, wherein the recorded data is stored in storage configured to store data for a period of time, and further comprising:
    transferring, to a memory, at least some of the recorded data stored in the storage at the time of at least one of the first request or the at least one additional request; and
    storing, in the memory, subsequent data obtained after the first request or the at least one additional request.

11. The method of claim 1, wherein the access to the recorded data is provided to at least one of the first device or the at least one additional device by a link.

12. The method of claim 1, wherein the time window associated with the recorded data is configurable based on one or more additional requests.

13. The method of claim 1, wherein the time window associated with the recorded data is determined based on a location of the first device.

14. An apparatus for providing access to recorded data associated with an event, comprising:
    one or more processors; and
    memory accessible to the one or more processors, the memory storing instructions, which upon execution by the one or more processors, cause the one or more processors to perform operations to:
       determine a location of a first device at a first time;
       confirm the location is within a predetermined vicinity coincident with the event and that the first time was within a time period associated with the event;
       obtain a first request for at least a portion of recorded data associated with the event, the first request being associated with the first device;
       obtain at least one additional request for at least the portion of the recorded data;
       consolidate the first request and the at least one additional request into a single request;
       extract a portion of the recorded data, wherein the extracted portion of the recorded data includes a time window relative to a time of the first request, the time window including a first time equal to or before the time of the first request and a second time equal to or after the time of the first request;
       generate, for the single request, a common media file for the extracted portion of the recorded data; and
       provide for the first device or at least one additional device, access to the common media file for the extracted portion of the recorded data based on confirming that the first device was within the predetermined vicinity coincident with the event within the time period.

15. The apparatus of claim 14, wherein the time window includes one of a first time before the time of the first request and a second time after the time of the first request, a first time before the time of the first request and a second time after the time of the additional request, a first time before the time of the additional request and a second time after the time of the additional request, or a first time before the time of the additional request and a second time after the time of the first request.

16. A non-transitory computer-readable medium having stored thereon instructions that, when executed by one or more processors, cause the one or more processors to:
    determine a location of a first device at a first time;
    confirm the location is within a predetermined vicinity coincident with an event and that the first time was within a time period associated with the event;
    obtain a first request for at least a portion of recorded data associated with the event, the first request being associated with the first device;
    obtain at least one additional request for at least the portion of the recorded data;
    consolidate the first request and the at least one additional request into a single request;
    extract a portion of the recorded data, wherein the extracted portion of the recorded data includes a time window relative to a time of the first request, the time window including a first time equal to or before the time of the first request and a second time equal to or after the time of the first request;
    generate, for the single request, a common media file for the extracted portion of the recorded data; and
    provide for the first device or at least one additional device, access to the common media file for the extracted portion of the recorded data based on confirming that the first device was within the predetermined vicinity coincident with the event within the time period.

* * * * *